(12) United States Patent
Lin et al.

(10) Patent No.: US 12,455,599 B2
(45) Date of Patent: Oct. 28, 2025

(54) SUPPORTING APPARATUS AND FOLDABLE ELECTRONIC DEVICE HAVING THE SAME

(71) Applicant: FOSITEK CORPORATION, New Taipei (TW)

(72) Inventors: Chun-Han Lin, New Taipei (TW); Yung-Chih Tseng, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 148 days.

(21) Appl. No.: 18/436,601

(22) Filed: Feb. 8, 2024

(65) Prior Publication Data

US 2025/0165034 A1    May 22, 2025

(30) Foreign Application Priority Data

Nov. 22, 2023   (TW) .................................. 112145111

(51) Int. Cl.
*G06F 1/16*   (2006.01)

(52) U.S. Cl.
CPC .......... *G06F 1/1656* (2013.01); *G06F 1/1616* (2013.01); *G06F 1/1652* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,786,207 B2* | 10/2017 | Kim | ......................... | G09F 9/301 |
| 9,811,119 B2* | 11/2017 | Seo | ..................... | H04M 1/0268 |
| 10,032,391 B2* | 7/2018 | Kim | ..................... | G06F 1/1641 |
| 11,048,302 B2* | 6/2021 | Seo | ..................... | H04M 1/0216 |
| 12,300,128 B2* | 5/2025 | Cho | ........................ | G06F 1/1652 |
| 2017/0365197 A1* | 12/2017 | Kim | ..................... | G06F 1/1641 |
| 2019/0069421 A1* | 2/2019 | Lee | ........................ | H05K 5/03 |
| 2019/0090364 A1* | 3/2019 | Shin | ...................... | H10K 59/40 |
| 2023/0027462 A1* | 1/2023 | Hsu | ........................ | G06F 1/1652 |
| 2023/0179690 A1* | 6/2023 | Lv | .......................... | G06F 1/1681 |
| | | | | 455/566 |
| 2025/0016256 A1* | 1/2025 | Chang | .................. | H04M 1/0243 |
| 2025/0165034 A1* | 5/2025 | Lin | ........................ | G06F 1/1681 |
| 2025/0220094 A1* | 7/2025 | Seo | ........................ | G06F 1/1652 |

* cited by examiner

*Primary Examiner* — Lisa Lea-Edmonds
(74) *Attorney, Agent, or Firm* — Birch, Stewart, Kolasch & Birch, LLP

(57) ABSTRACT

A foldable electronic apparatus includes a flexible display, a housing unit, and a supporting device. The supporting device includes a flexible first supporting plate, a flexible second supporting plate, and a plurality of supporting members. Each of the supporting members has a first end portion that is connected to the first supporting plate, a second end portion that is connected to the second supporting plate, and a main body portion that has two opposite sides respectively connected to the first end portion and the second end portion. The supporting device is operable to convert between a first state, in which two opposite sides of the supporting device are distal from each other, and a second state, in which the supporting device is folded along a folding axis such that the opposite sides of the supporting device are proximate to each other.

14 Claims, 8 Drawing Sheets

SUPPORTING APPARATUS AND FOLDABLE ELECTRONIC DEVICE HAVING THE SAME

CROSS-REFERENCE TO RELATED APPLICATION

This application claims priority to Taiwanese Invention Patent Application No. 112145111, filed on Nov. 22, 2023, the entire disclosure of which is incorporated by reference herein.

FIELD

The disclosure relates to a supporting device and a foldable electronic apparatus having the supporting device, and more particularly to a supporting device for folding a flexible display, and a foldable electronic apparatus having the supporting device.

BACKGROUND

To make an electronic apparatus having a large screen (e.g., a smartphone) portable, the electronic apparatus is generally designed to be foldable, and a flexible display is adopted as the large screen of the electronic apparatus. A conventional foldable electronic apparatus typically includes a screen, a multi-link hinge assembly, and two supporting platforms that are respectively disposed on two opposite portions of a rear side of the screen. Each of the supporting platforms is drivable by the multi-link hinge assembly to pivot about a same folding axis, and to urge a respective one of the opposite portions of the screen to move, thereby folding or unfolding the screen. However, because a structure of the multi-link hinge assembly is complicated and requires mass customization, it is not easy to assemble the multi-link hinge assembly, thereby resulting in high manufacturing costs of the multi-link hinge assembly. In addition, some components of the multi-link hinge assembly may overlap each other when the screen is unfolded, and a user may feel unevenness of the screen when the user touches the screen, thus the user may experience discomfort when using the conventional foldable electronic apparatus.

SUMMARY

Therefore, an object of the disclosure is to provide a supporting device that can alleviate at least one of the drawbacks of the prior art.

According to the disclosure, the supporting device is adapted to be connected to a flexible display that is operable to convert between an open state, in which the flexible display lies on an imaginary plane that is perpendicular to a first direction, and a folded state, in which the flexible display is folded along a folding axis that extends in a second direction orthogonal to the first direction. The supporting device includes a flexible first supporting plate, a flexible second supporting plate, and a plurality of supporting members. The first supporting plate is adapted to be attached to a surface of the flexible display. The second supporting plate is located at one side of the first supporting plate opposite to the flexible display, and is spaced apart from the first supporting plate. The supporting members are located between the first supporting plate and the second supporting plate, and are spaced apart from each other in a third direction orthogonal to the first direction and the second direction. Each of the supporting members has a first end portion that is connected to the first supporting plate, a second end portion that is connected to the second supporting plate, and a main body portion that has two opposite sides respectively connected to the first end portion and the second end portion. The supporting device is operable to convert between a first state, in which two opposite sides of the supporting device are distal from each other, and a second state, in which the supporting device is folded along the folding axis such that the opposite sides of the supporting device are proximate to each other. During conversion of the supporting device from the first state to the second state, the flexible display is converted to the folded state, and the first supporting plate and the second supporting plate are bent such that the first end portion and the second end portion of at least one of the supporting members are deformed and that an inclining angle of the main body portion of the at least one of the supporting members relative to the first supporting plate and the second supporting plate changes.

Another object of the disclosure is to provide a foldable electronic apparatus that can alleviate at least one of the drawbacks of the prior art.

According to the disclosure, the foldable electronic apparatus includes the supporting device as mentioned above, a flexible display, and a housing unit. The flexible display is operable to convert between an open state, in which the flexible display lies on an imaginary plane that is perpendicular to a first direction, and a folded state, in which the flexible display is folded along a folding axis that extends in a second direction orthogonal to the first direction. The housing unit includes two housing bodies and is operable to convert between a first arrangement state, in which the housing bodies are arranged in a third direction orthogonal to the first direction and the second direction, and a second arrangement state, in which the housing bodies are arranged in the first direction. Each of the housing bodies has a surface that faces the flexible display and that is indented in the first direction to form an accommodating space. The accommodating spaces of the housing bodies spatially communicate with each other. The flexible display is disposed in the accommodating spaces of the housing bodies. The supporting device is located between the flexible display and the housing unit, and is disposed in the accommodating spaces of the housing bodies. When the housing unit is in the first arrangement state, the supporting device is in the first state and the flexible display is in the open state. When an external force is exerted on at least one of the housing bodies of the housing unit to convert the housing unit from the first arrangement state to the second arrangement state, the at least one of the housing bodies urges the second supporting plate to bend along the folding axis such that the opposite sides of the supporting device approach each other, thereby converting the supporting device to the second state and converting the flexible display to the folded state.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
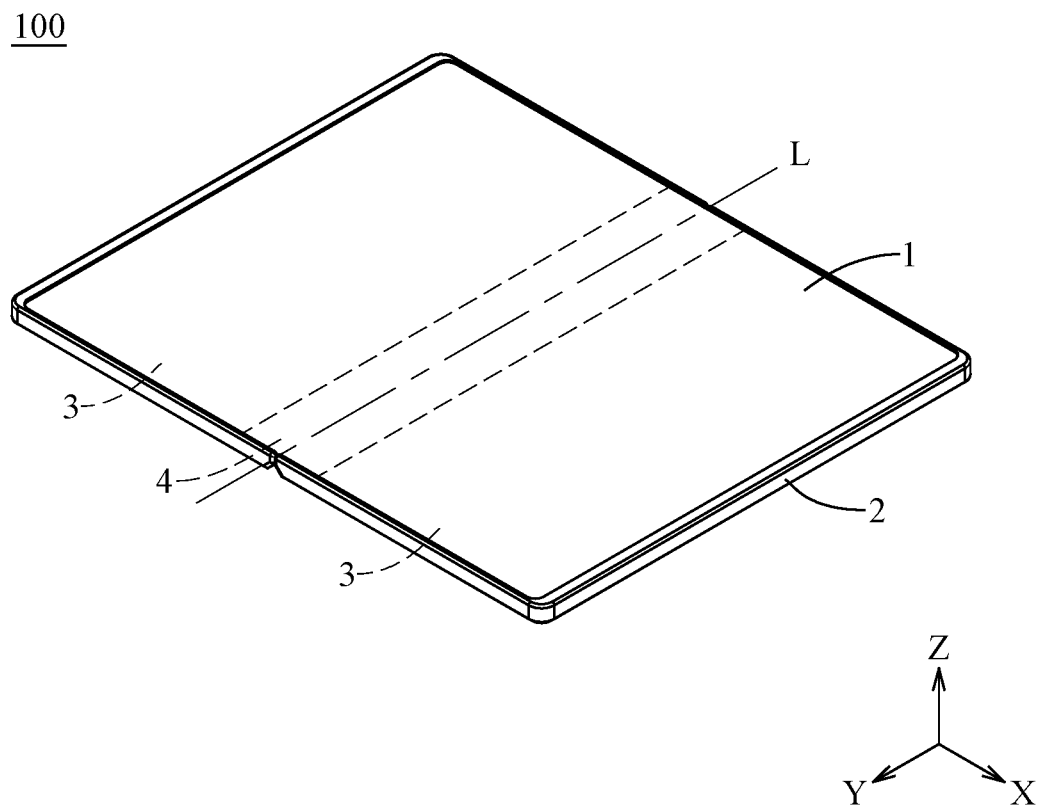
FIG. 1 is a perspective view of an embodiment of a foldable electronic apparatus according to the disclosure, illustrating the foldable electronic apparatus being unfolded.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 6:
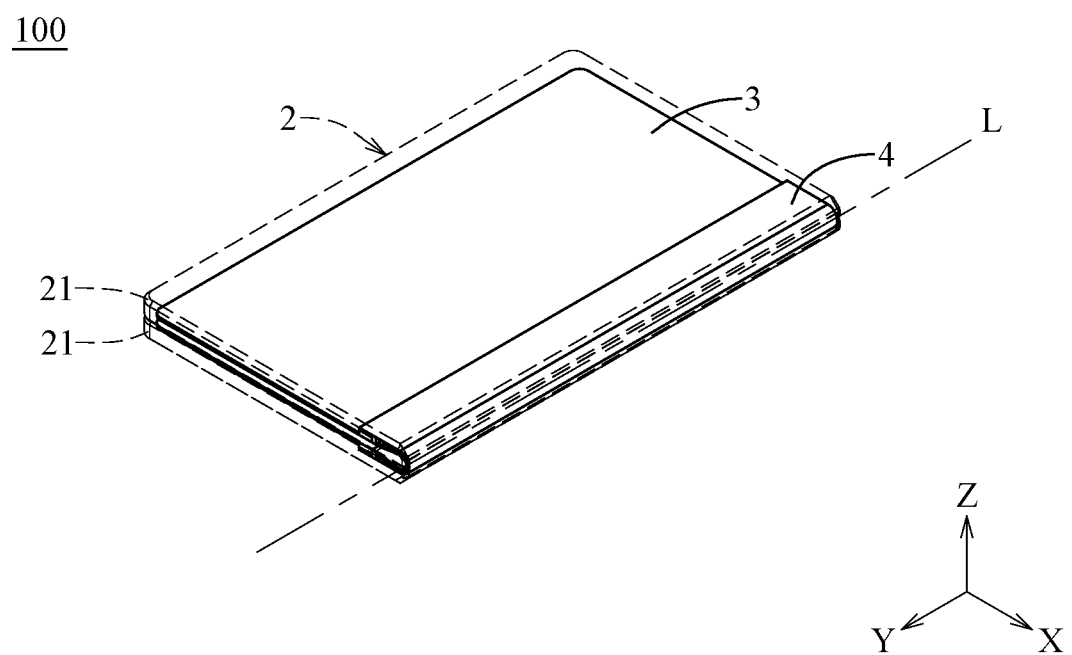
FIG. 6 is another perspective view of the embodiment, illustrating the foldable electronic apparatus being folded.

Referring to FIGS. 1 and 6, an embodiment of a foldable electronic apparatus 100 according to the disclosure may be, but not limited to be, a mobile phone, a tablet computer, or a laptop, and includes components that are not shown in FIGS., such as electronic components and wires. The foldable electronic apparatus 100 is operable to be unfolded when in use, or to be folded when not in use. In this embodiment, the foldable electronic apparatus 100 is configured to be a horizontal folding electronic apparatus, but in one embodiment, the foldable electronic apparatus 100 may be configured to be a vertical folding electronic apparatus. A direction in which the foldable electronic apparatus 100 may be folded is not limited.

Figure 2:
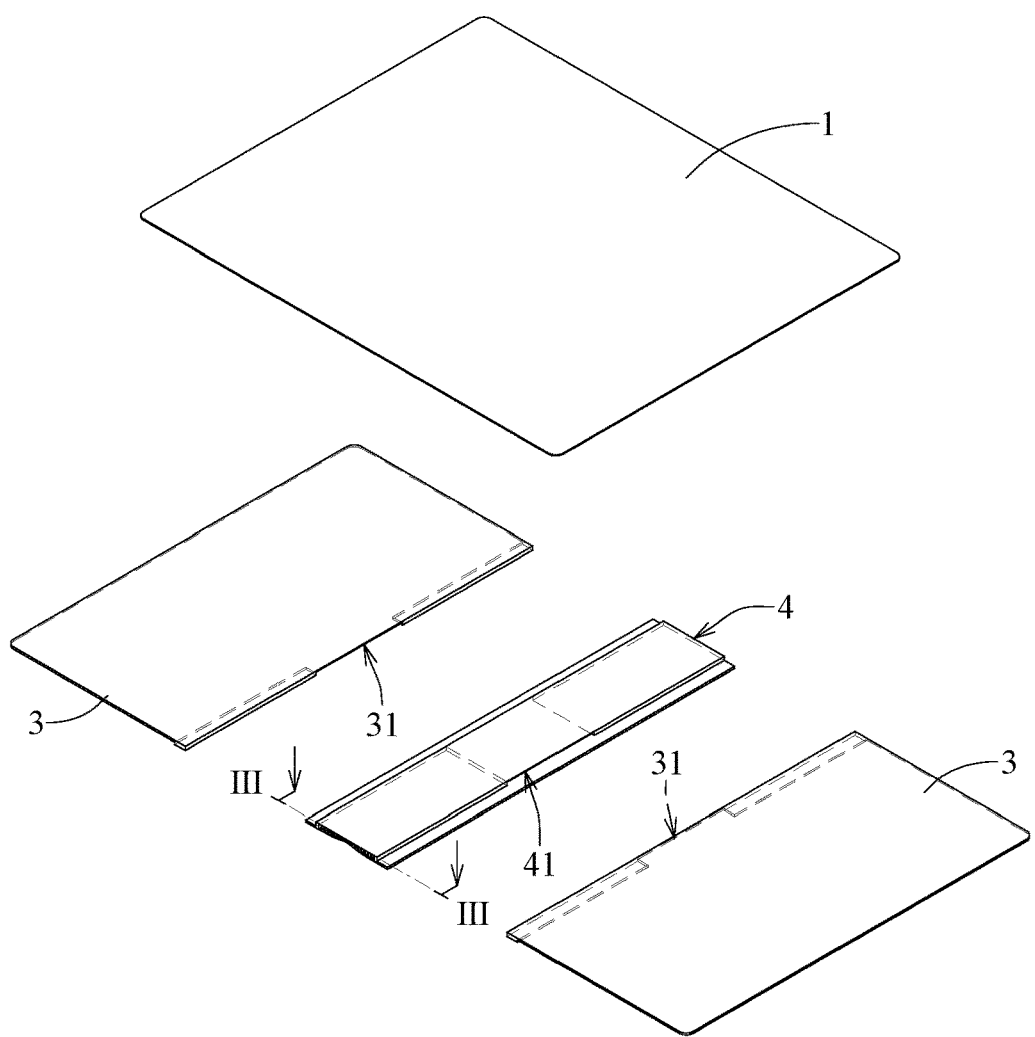
FIG. 2 is an exploded perspective view of the foldable electronic apparatus.
Figure 2:
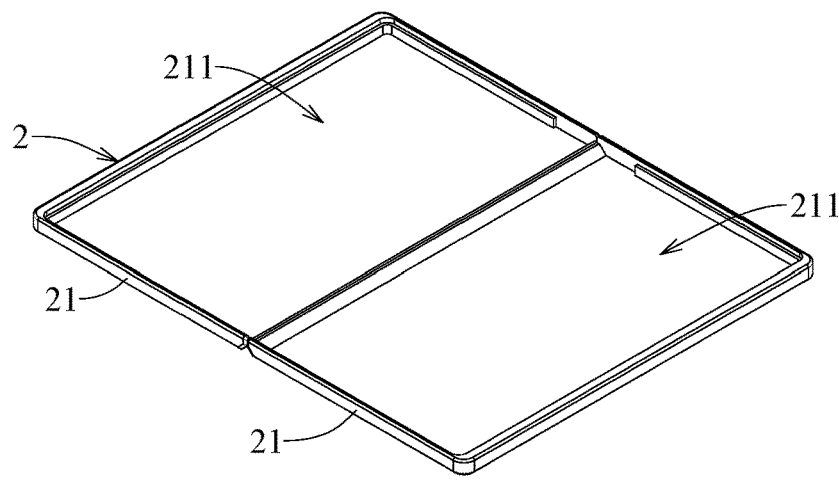
Figure 7:
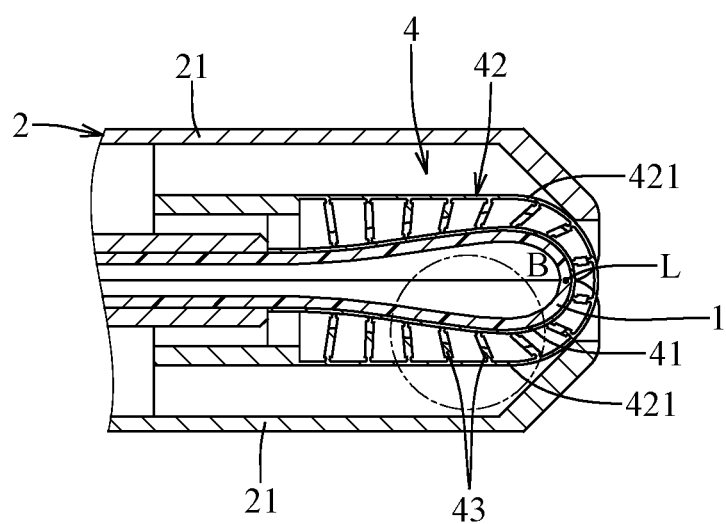
FIG. 7 is a fragmentary sectional view illustrating the foldable electronic apparatus being folded.

Referring further to FIGS. 2 and 7, the foldable electronic apparatus 100 further includes a flexible display 1, a housing unit 2, two plate members 3, and a supporting device 4. The flexible display 1 has a thin plate shape, and may be, but not limited to be an organic light-emitting diode display panel, or a piece of electronic paper. The flexible display 1 is operable to convert between an open state (see FIG. 1), in which the flexible display 1 lies on an imaginary plane that is perpendicular to a first direction (Z), and a folded state (see FIG. 7), in which the flexible display 1 is folded along a folding axis (L) that extends in a second direction (Y) orthogonal to the first direction (Z). Specifically, when the flexible display 1 is in the folded state, two opposite sides of the flexible display 1 in a third direction (X) orthogonal to the first direction (Z) and the second direction (Y) are arranged in the first direction (Z). It is noted that, in this embodiment, the third direction (X) of the foldable electronic apparatus 100 coincides with a left-right direction of a user, the second direction (Y) of the foldable electronic apparatus 100 coincides with a front-rear direction of the user, and the first direction (Z) of the foldable electronic apparatus 100 coincides with an up-down direction of the user. However, in certain embodiments, the first, second, and third directions (Z, Y, X) of the foldable electronic apparatus 100 may not be limited to the above-mentioned directions of the user.

Referring to FIGS. 1 and 2 again, the housing unit 2 includes two housings bodies 21, and is operable to convert between a first arrangement state, in which the housing bodies 21 are arranged in the third direction (X), and a second arrangement state (see FIG. 7), in which the housing bodies 21 are arranged in the first direction (Z). Each of the housing bodies 21 may be, but not limited to be, similar to a rectangular cuboid. Each of the housing bodies 21 has a surface that faces the flexible display 1 and that is indented in the first direction (Z) to form an accommodating space 211. Specifically, as shown in FIGS. 1 and 2, a top surface of each of the housing bodies 21 serves as the surface of the housing body 21. The accommodating spaces 211 of the housing bodies 21 spatially communicate with each other. The flexible display 1 is disposed in the accommodating spaces 211 of the housing bodies 21. Each of the plate members 3 may be, but not limited to be, a rectangular rigid plastic plate or a metal plate, and is mounted to the accommodating space 211 of a respective one of the housing bodies 21. The plate members 3 respectively abut against the opposite sides of the flexible display 1 (i.e., left and right sides of the flexible display 1 shown in FIGS. 1 and 2) so that only a middle portion of the flexible display 1 that is located between the opposite sides of the flexible display 1 may be bendable. One side of each of the plate members 3 that is adjacent to another one of the plate members 3 has a wire opening 31 that opens toward the another one of the plate members 3 in the third direction (X), and that is for a power supply wire (not shown) to pass therethrough.

Figure 3:
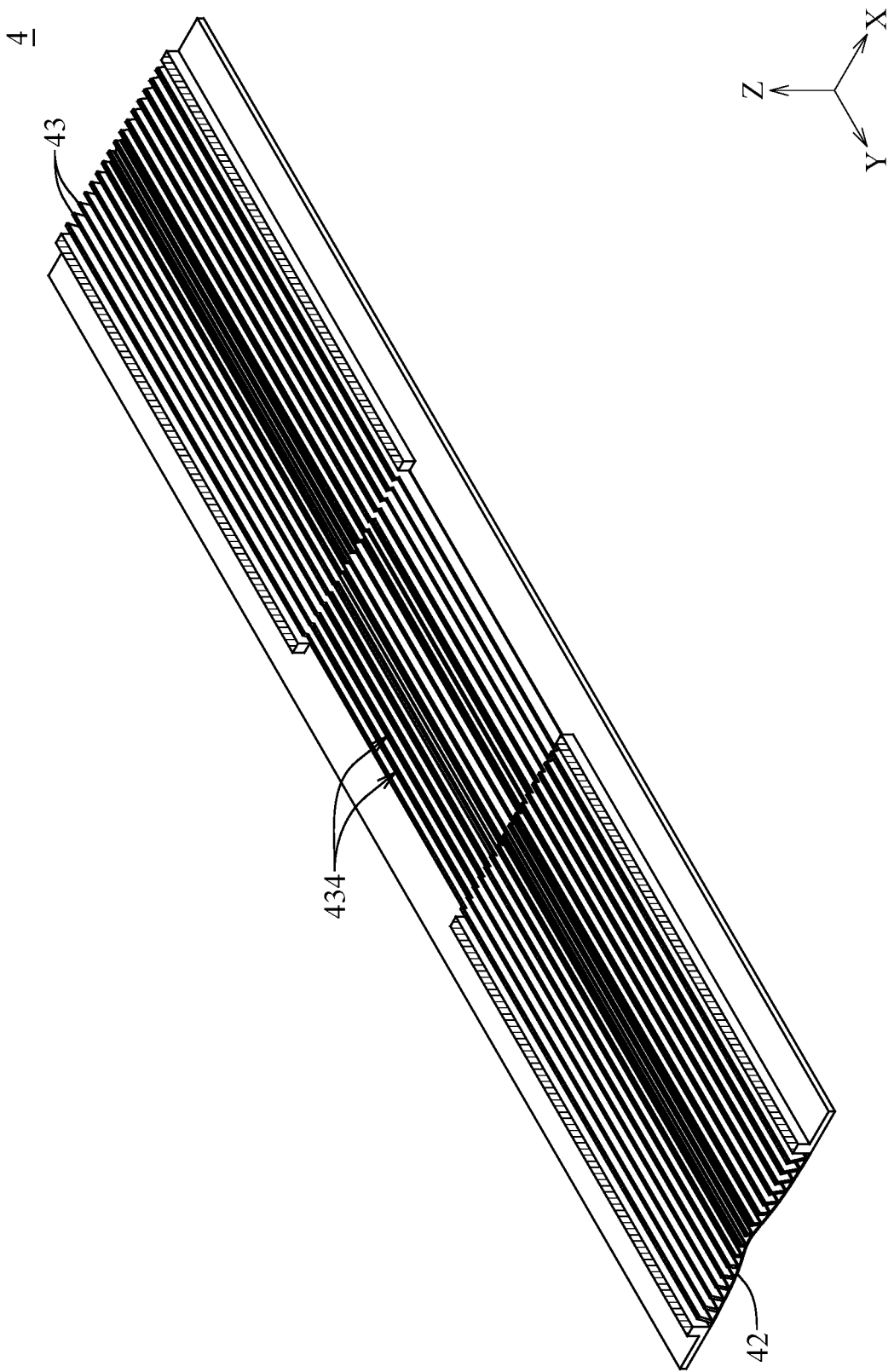
FIG. 3 is a cutaway view of a supporting device of the embodiment.
Figure 4:
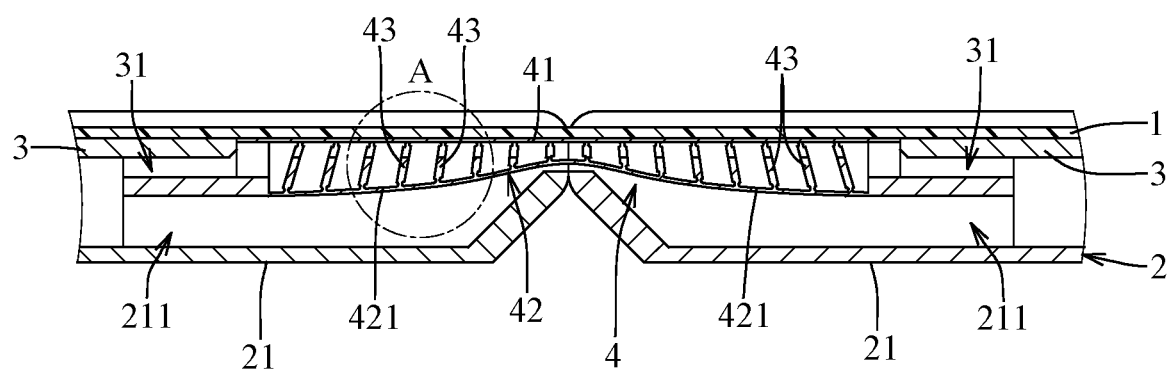
FIG. 4 is a fragmentary sectional view illustrating the foldable electronic apparatus being unfolded.

Referring to FIGS. 3 and 4, in cooperation with FIGS. 1 and 2, the supporting device 4 is located between the flexible display 1 and the housing unit 2, is connected to the flexible display 1, is disposed between the plate members 3, and has two opposite sides (i.e., left and right sides as shown in FIGS. 1 to 4) that are respectively disposed in the accommodating spaces 211. The supporting device 4 corresponds in position to a bendable portion (i.e., the middle portion) of the flexible display 1 in the first direction (Z). The supporting device 4 includes a flexible first supporting plate 41, a flexible second supporting plate 42, and a plurality of supporting members 43. The first supporting plate 41 is a thin plate, and is attached to a surface of the flexible display 1 that faces the accommodating spaces 211 (i.e., a bottom surface of the flexible display 1). In this embodiment, a surface of the first supporting plate 41 that faces the flexible display 1 is flush with a surface of each of the plate members 3 that faces the flexible display 1 so that the user may not feel unevenness of the flexible display 1 when the user touches the flexible display 1.

The second supporting plate 42 is a thin plate, is located at one side of the first supporting plate 41 opposite to the flexible display 1 (i.e., the second supporting plate 42 is located between the first supporting plate 41 and the housing unit 2), and is spaced apart from the first supporting plate 41. In this embodiment, the one side of each of the plate members 3 that is adjacent to the another one of the plate members 3 is connected to a respective one of a left side and a right side of the second supporting plate 42.

Referring to FIGS. 2 to 4 again, the supporting members 43 are located between the first supporting plate 41 and the second supporting plate 42, and are spaced apart from each other in the third direction (X) so that the supporting device 4 may stand a load in the first direction (Z). Each of the supporting members 43 has a first end portion 431 that is connected to the first supporting plate 41, a second end portion 432 that is connected to the second supporting plate 42, and a main body portions 433 that has two opposite sides respectively connected to the first and second end portions 431, 432. In this embodiment, as shown in FIGS. 3 and 4, each of the supporting members 43 is thin plate-shaped, is elongated in the second direction (Y), and extends from the first supporting plate 41 to the second supporting plate 42.

However, in one embodiment, each of the supporting members 43 is not limited to have the aforesaid structure, and may have a column structure (not shown) that extends from the first supporting plate 41 to the second supporting plate 42.

Figure 5:
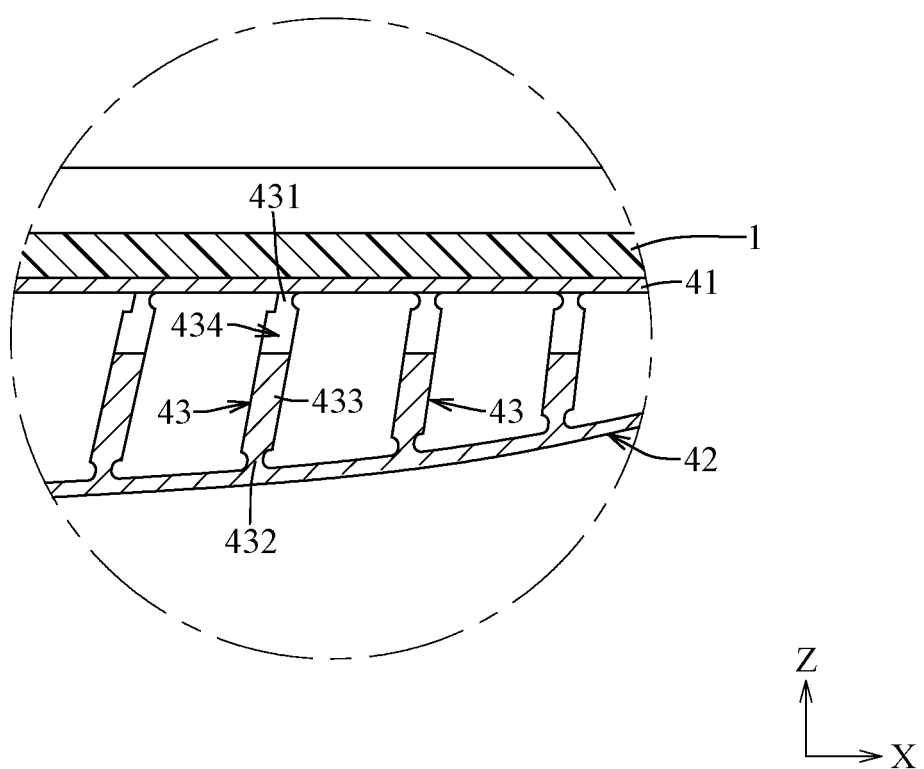
FIG. 5 is an enlarged view of FIG. 4 taken from an encircled area (A) of FIG. 4.
Figure 8:
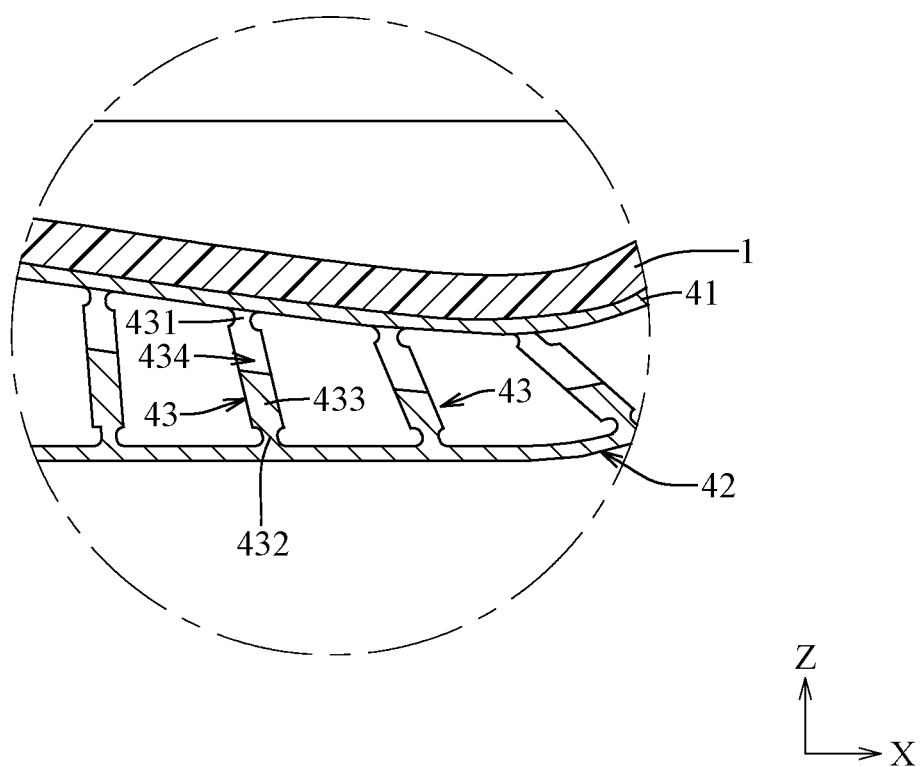
FIG. 8 is an enlarged view of FIG. 7 taken from an encircled area (B) of FIG. 7.

Referring further to FIGS. 5 and 8, in cooperation with FIGS. 1, 4, and 7, the supporting device 4 is operable to convert between a first state, in which the opposite sides of the supporting device 4 are distal from each other, and a second state, in which the supporting device 4 is folded along the folding axis (L) such that the opposite sides of the supporting device 4 are proximate to each other. During conversion of the supporting device 4 from the first state to the second state, the flexible display 1 is converted to the folded state, and the first supporting plate 41 and the second supporting plate 42 are bent such that the first end portion 431 and the second end portion 432 of at least one of the supporting members 43 are deformed and that an inclining angle of the main body portion 433 of the at least one of the supporting members 43 relative to the first supporting plate 41 and the second supporting plate 42 changes. When the foldable electronic apparatus 100 is not folded (see FIG. 4), the housing unit 2 is in the first arrangement state, the supporting device 4 is in the first state, and the flexible display 1 is in the open state. When an external force is exerted on at least one of the housing bodies 21 of the housing unit 2 to convert the housing unit 2 from the first arrangement state to the second arrangement state, the at least one of the housing bodies 21 urges the second supporting plate 42 to bend along the folding axis (L) such that the opposite sides of the supporting device 4 approach each other, thereby converting the supporting device 4 to the second state and converting the flexible display 1 to the folded state. At this time, because the housing unit 2, the supporting device 4, and the flexible display 1 are respectively in the second arrangement state, the second state, and the folded state, the foldable electronic apparatus 100 is folded (see FIG. 7). When the supporting device 4 is in the second state, a curvature of the second supporting plate 42 is different from a curvature of the first supporting plate 41. Consequently, when the foldable electronic apparatus 100 is folded, each of the middle portion of the flexible display 1, a middle portion of the first supporting plate 41 in the third direction (X), and a middle portion of the second supporting plate 42 in the third direction (X) is bent along the folding axis (L) such that the opposite sides of the flexible display 1 are arranged in the first direction (Z), that two opposite sides of the first supporting plate 41 in the third direction (X) are arranged in the first direction (Z), and that two opposite sides of the second supporting plate 42 in the third direction (X) are arranged in the first direction (Z). Moreover, as shown in FIG. 7, when the foldable electronic apparatus 100 is folded, the supporting members 43 are spaced apart from each other, and are arranged along an imaginary curve (not shown) that is similar to a U-curve on a section plane perpendicular to the second direction (Y).

Referring to FIGS. 4 and 5 again, in this embodiment, for each of the supporting members 43, a thickness of the first end portion 431 in the third direction (X) is smaller than a thickness of the main body portion 433 in the third direction (X). That is to say, the first end portion 431 of each of the supporting members 43 is a necked region of the supporting member 43. Therefore, when the at least one of the supporting members 43 is subjected to a force, deformation of the first end portion 431 of the at least one of the supporting members 43 may occur earlier than deformation of the main body portion 433 of the at least one of the supporting members 43, thereby changing the inclining angle of the main body portion 433 of the at least one of the supporting members 43 relative to the first supporting plate 41. For each of the supporting members 43, a thickness of the second end portion 432 in the third direction (X) is smaller than a thickness of the main body portion 433 in the third direction (X). Similarly, the second end portion 432 of each of the supporting members 43 is a necked region of the supporting member 43. Therefore, when the at least one of the supporting members 43 is subjected to a force, deformation of the second end portion 432 of the at least one of the supporting members 43 may occur earlier than the deformation of the main body portion 433 of the at least one of the supporting members 43, thereby changing the inclining angle of the main body portion 433 of the at least one of the supporting members 43 relative to the second supporting plate 42. However, in certain embodiments, the thickness of the first end portion 431 and the thickness of the second end portion 432 of each of the supporting members 43 in the third direction (X) may be the same as the thickness of the main body portion 433 of the supporting member 43 in the third direction (X), and the first end portion 431 and the second end portion 432 of the at least one of the supporting members 43 are resiliently deformable (e.g., the at least one of the supporting members 43 is made of a rubber material) so that during the conversion of the supporting device 4 from the first state to the second state, the first end portion 431 and the second end portion 432 of the at least one of the supporting members 43 are resiliently deformed. It is noted that, the manner in which the first end portions 431 and the second end portions 432 of the supporting members 43 are deformed is not limited to the aforesaid description.

Referring to FIGS. 1, 4, 5, 7 and 8 again, the second supporting plate 42 includes two supporting portions 421 that are arranged in the third direction (X) and that are integrally connected to each other. The supporting portions 421 are respectively disposed in the accommodating spaces 211 of the housing bodies 21. A portion of the supporting members 43 is connected to one of the supporting portions 421, and a remaining portion of the supporting members 43 is connected to another one of the supporting portions 421. Each of the supporting portions 421 of the second supporting plate 42 has two opposite ends that are respectively proximate to and distal from the folding axis (L). For each of the supporting portions 421, a distance between the first supporting plate 41 and the supporting portion 421 in the first direction (Z) increases from one of the opposite ends thereof that is proximate to the folding axis (L) to another one of the opposite ends thereof that is distal from the folding axis (L) so that the another one of the opposite ends of each of the supporting portions 421 may be oblique to the surface of the respective one of the housing bodies 21 when the foldable electronic apparatus 100 is not folded (see FIG. 4), and that the another one of the opposite ends of each of the supporting portions 421 may be parallel to the surface of the respective one of the housing bodies 21 when the foldable electronic apparatus 100 is folded (see FIG. 7). As such, when the foldable electronic apparatus 100 is folded, a cross section of the second supporting plate 42 is U-shaped, and a cross section of each of the flexible display 1 and the first supporting plate 41 is teardrop-shaped (see FIG. 7). The flexible display 1 is thus prevented from damage caused by over-bending.

Referring to FIGS. 2 to 5 again, each of the supporting members 43 further has two opposite surfaces in the third direction (X), and a through hole 434 (see FIG. 5) that extends through the surfaces in the third direction (X). As shown in FIG. 5, left and right surfaces of each of the supporting members 43 serve as the surfaces of the supporting member 43. The through holes 434 of the supporting members 43 are for the power supply wire that passes through the wire opening 31 of any one of the plate members 3 to pass therethrough. Furthermore, the through hole 434 of each of the supporting members 43 extends through the first end portion 431 of the supporting member 43 and one of the opposite sides of the main body portion 433 of the supporting member 43 that is connected to the first end portion 431 of the supporting member 43 in the third direction (X). Consequently, when the supporting device 4 is in the second state, the extent to which the power supply wire that passes through the through holes 434 stretches may be smaller. As shown in FIGS. 3 and 5, in this embodiment, the through hole 434 of each of the supporting members 43 is formed in a middle section of the first end portion 431 of the supporting member 43 in the second direction (Y). However, in certain embodiments, the through hole 434 of each of the supporting members 43 may be formed in a different section of the first end portion 431 of the supporting member 43 in the second direction (Y) (i.e., the through hole 434 of each of the supporting members 43 may not be limited to be formed in a specific section of the supporting member 43 in the second direction (Y)).

In summary, by virtue of the first and second supporting plates 41, 42 being flexible, and by virtue of the first and second end portions 431, 432 of the at least one of the supporting members 43 being resiliently deformable, the supporting device 4 may be used for a wide range of flexible displays that meet different customer requirements. In addition, by virtue of the supporting device 4 corresponding in position to the bendable portion of the flexible display 1 in the first direction (Z), by virtue of the first supporting plate 41 being attached to the bottom surface of the flexible display 1, and by virtue of the surface of the first supporting plate 41 that faces the flexible display 1 being flush with the surface of each of the plate members 3 that faces the flexible display 1, the user may feel smoothness of the flexible display 1 when the user touches the flexible display 1. The foldable electronic apparatus 100 may thus offer greater comfort to the user. Therefore, the purpose of the disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A supporting device adapted to be connected to a flexible display that is operable to convert between an open state, in which the flexible display lies on an imaginary plane that is perpendicular to a first direction, and a folded state, in which the flexible display is folded along a folding axis that extends in a second direction orthogonal to the first direction, the supporting device comprising:
   a flexible first supporting plate adapted to be attached to a surface of the flexible display;
   a flexible second supporting plate located at one side of the first supporting plate opposite to the flexible display, and spaced apart from the first supporting plate; and
   a plurality of supporting members located between the first supporting plate and the second supporting plate, and spaced apart from each other in a third direction orthogonal to the first direction and the second direction, each of the supporting members having a first end portion that is connected to the first supporting plate, a second end portion that is connected to the second supporting plate, and a main body portion that has two opposite sides respectively connected to the first end portion and the second end portion;
   wherein the supporting device is operable to convert between a first state, in which two opposite sides of the supporting device are distal from each other, and a second state, in which the supporting device is folded along the folding axis such that the opposite sides of the supporting device are proximate to each other, during conversion of the supporting device from the first state to the second state, the flexible display being converted to the folded state, and the first supporting plate and the second supporting plate being bent such that the first end portion and the second end portion of at least one of the supporting members are deformed and that an inclining angle of the main body portion of the at least one of the supporting members relative to the first supporting plate and the second supporting plate changes.

2. The supporting device as claimed in claim 1, wherein when the supporting device is in the second state, a curvature of the second supporting plate is different from a curvature of the first supporting plate.

3. The supporting device as claimed in claim 2, wherein the second supporting plate includes two supporting portions that are arranged in the third direction and that are integrally connected to each other, each of the supporting portions of the second supporting plate having two opposite ends that are respectively proximate to and distal from the folding axis, for each of the supporting portions, a distance between the first supporting plate and the supporting portion in the first direction increasing from one of the opposite ends thereof that is proximate to the folding axis to another one of the opposite ends thereof that is distal from the folding axis.

4. The supporting device as claimed in claim 1, wherein for each of the supporting members, a thickness of the first end portion in the third direction is smaller than a thickness of the main body portion in the third direction.

5. The supporting device as claimed in claim 1, wherein for each of the supporting members, a thickness of the second end portion in the third direction is smaller than a thickness of the main body portion in the third direction.

6. The supporting device as claimed in claim 1, wherein the first end portion and the second end portion of the at least one of the supporting members are resiliently deformable so that during the conversion of the supporting device from the first state to the second state, the first end portion and the second end portion of the at least one of the supporting members are resiliently deformed.

7. A foldable electronic apparatus, comprising:
a flexible display operable to convert between an open state, in which the flexible display lies on an imaginary plane that is perpendicular to a first direction, and a folded state, in which the flexible display is folded along a folding axis that extends in a second direction orthogonal to the first direction;
a housing unit including two housing bodies and operable to convert between a first arrangement state, in which the housing bodies are arranged in a third direction orthogonal to the first direction and the second direction, and a second arrangement state, in which the housing bodies are arranged in the first direction, each of the housing bodies having a surface that faces the flexible display and that is indented in the first direction to form an accommodating space, the accommodating spaces of the housing bodies spatially communicating with each other, the flexible display being disposed in the accommodating spaces of the housing bodies; and
the supporting device as claimed in claim 1, the supporting device being located between the flexible display and the housing unit, and being disposed in the accommodating spaces of the housing bodies;
wherein, when the housing unit is in the first arrangement state, the supporting device is in the first state and the flexible display is in the open state; and
wherein, when an external force is exerted on at least one of the housing bodies of the housing unit to convert the housing unit from the first arrangement state to the second arrangement state, the at least one of the housing bodies urges the second supporting plate to bend along the folding axis such that the opposite sides of the supporting device approach each other, thereby converting the supporting device to the second state and converting the flexible display to the folded state.

8. The foldable electronic apparatus as claimed in claim 7, wherein each of the supporting members further has two opposite surfaces in the third direction, and a through hole that extends through the opposite surfaces in the third direction.

9. The foldable electronic apparatus as claimed in claim 8, wherein the through hole of each of the supporting members extends through the first end portion of the supporting member and one of the opposite sides of the main body portion of the supporting member that is connected to the first end portion of the supporting member in the third direction.

10. The foldable electronic apparatus as claimed in claim 7, wherein when the supporting device is in the second state, a curvature of the second supporting plate is different from a curvature of the first supporting plate.

11. The foldable electronic apparatus as claimed in claim 10, wherein the second supporting plate includes two supporting portions that are arranged in the third direction and that are integrally connected to each other, each of the supporting portions of the second supporting plate having two opposite ends that are respectively proximate to and distal from the folding axis, for each of the supporting portions, a distance between the first supporting plate and the supporting portion in the first direction increasing from one of the opposite ends thereof that is proximate to the folding axis to another one of the opposite ends thereof that is distal from the folding axis.

12. The foldable electronic apparatus as claimed in claim 7, wherein for each of the supporting members, a thickness of the first end portion in the third direction is smaller than a thickness of the main body portion in the third direction.

13. The foldable electronic apparatus as claimed in claim 7, wherein for each of the supporting members, a thickness of the second end portion in the third direction is smaller than a thickness of the main body portion in the third direction.

14. The foldable electronic apparatus as claimed in claim 7, wherein the first end portion and the second end portion of the at least one of the supporting members are resiliently deformable so that during the conversion of the supporting device from the first state to the second state, the first end portion and the second end portion of the at least one of the supporting members are resiliently deformed.

\* \* \* \* \*